United States Patent [19]

Moss et al.

[11] Patent Number: 5,367,138
[45] Date of Patent: Nov. 22, 1994

[54] WELDING ASSURANCE CONTROL TECHNIQUES

[75] Inventors: Larry E. Moss; Randolph P. Formanek, Both of Danville, Ill.; Johnny B. Hogg, deceased, late of Danville, Ill., by Carol Hogg, executrix; William M. Derby, Jr., Bethlehem, Pa.

[73] Assignee: Automation International Incorporated, Danville, Ill.

[21] Appl. No.: 84,864

[22] Filed: Jun. 28, 1993

[51] Int. Cl.⁵ ............................................. B23K 11/04
[52] U.S. Cl. .................................... 219/109; 219/97; 219/100
[58] Field of Search ................. 219/109, 97, 100, 101, 219/104

[56] References Cited

U.S. PATENT DOCUMENTS

| | | | |
|---|---|---|---|
| 2,399,453 | 4/1946 | Sinclair | 219/4 |
| 2,443,965 | 6/1948 | Seeloff | 219/4 |
| 2,727,969 | 12/1955 | Platte | 219/4 |
| 3,335,257 | 8/1967 | Sakharnov et al. | 219/101 |
| 3,445,768 | 5/1969 | Ferguson | 324/142 |
| 3,509,310 | 4/1970 | Riley | 219/97 |
| 3,542,994 | 11/1970 | Deffenbaugh et al. | 219/97 |
| 3,548,144 | 12/1970 | Riley | 219/97 |
| 3,555,237 | 1/1971 | Riley | 219/97 |
| 3,612,811 | 10/1971 | Lifshits | 219/100 |
| 3,637,971 | 1/1972 | Needham et al. | 219/97 |
| 3,681,563 | 8/1972 | Lifshits et al. | 219/97 |
| 3,748,430 | 7/1973 | Deffenbaugh | 219/97 |
| 3,748,431 | 7/1973 | Melbard et al. | 219/97 |
| 3,823,299 | 7/1974 | Metcalfe et al. | 219/83 |
| 3,870,851 | 3/1975 | Deffenbaugh et al. | 219/97 |
| 3,932,725 | 1/1976 | Ganowski | 219/110 |
| 3,980,857 | 9/1976 | Sciaky | 219/100 |
| 4,001,539 | 1/1977 | Franchi et al. | 219/110 |
| 4,024,371 | 5/1977 | Drake | 219/110 |
| 4,084,075 | 4/1978 | Deffenbaugh | 219/97 |
| 4,101,753 | 7/1978 | Buff et al. | 219/97 |
| 4,208,569 | 6/1980 | Kuchuk-Yatsenko et al. | 219/97 |
| 4,296,305 | 10/1981 | Lifshits et al. | 219/101 |
| 4,321,452 | 3/1982 | Deffenbaugh | 219/100 |
| 4,329,560 | 5/1982 | Tanuma | 219/100 |
| 4,376,242 | 3/1983 | Buff et al. | 219/97 |
| 4,383,162 | 5/1983 | Ellis | 219/100 |
| 4,415,793 | 11/1983 | Podola et al. | 219/110 |
| 4,645,896 | 2/1987 | Baba et al. | 219/100 |
| 4,686,346 | 8/1987 | Kuchuk-Yatsenko et al. | 219/110 |
| 4,725,707 | 2/1988 | Kuchuk-Yatsenko et al. | 219/100 |
| 4,733,044 | 3/1988 | Kuchuk-Yatsenko et al. | 219/100 |
| 4,940,876 | 7/1990 | Kuchuk-Yatsenko et al. | 219/110 |

*Primary Examiner*—Clifford C. Shaw
*Attorney, Agent, or Firm*—Allegretti & Witcoff, Ltd.

[57] ABSTRACT

Techniques for assuring the accuracy of the welding of a part including a part calibration cycle, a tap check cycle and a gap detection cycle. The part calibration cycle determines the electrical load presented by the part to the welder transformer. The tap check cycle verifies that the operator has set the correct tap on the primary of the welder transformer, The gap detection cycle finds the actual spacing between the platen when the ends of the part are substantially touching so that the ends of the part can be accurately spaced at the beginning of the weld cycle.

28 Claims, 18 Drawing Sheets

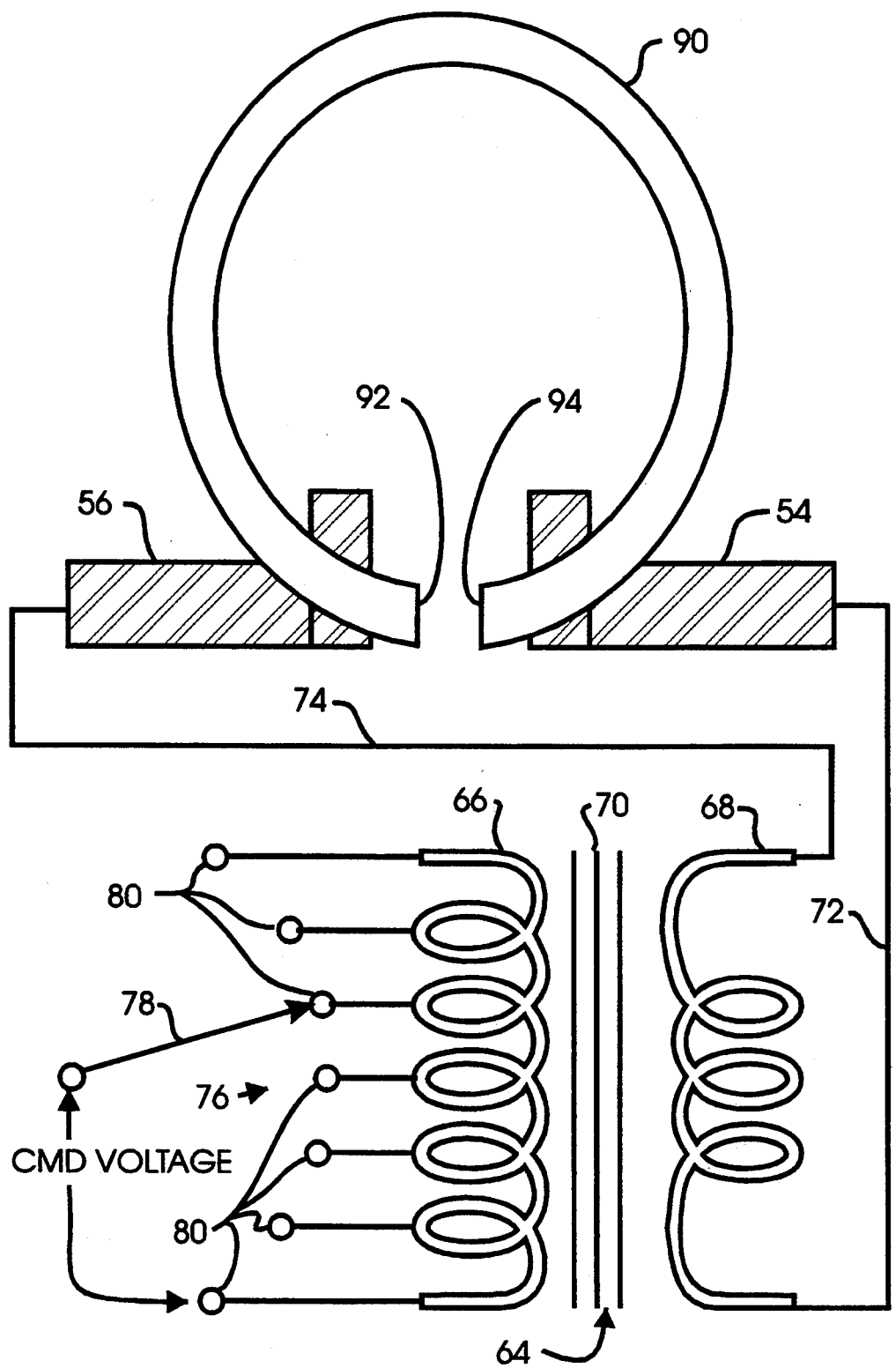

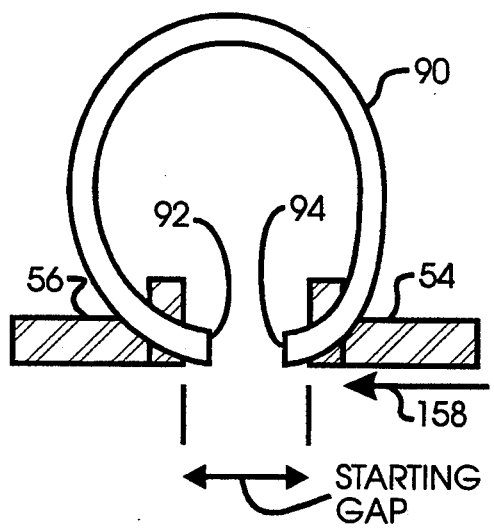
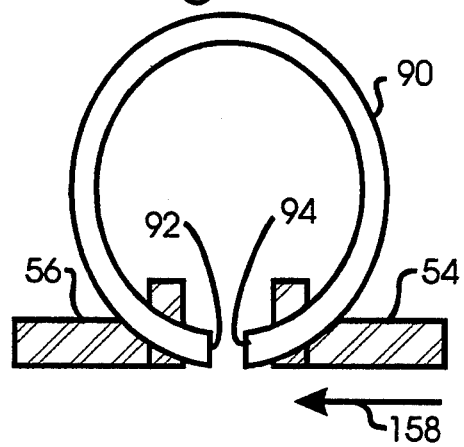
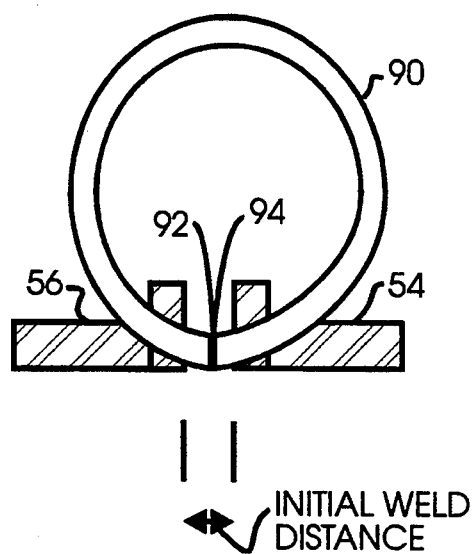

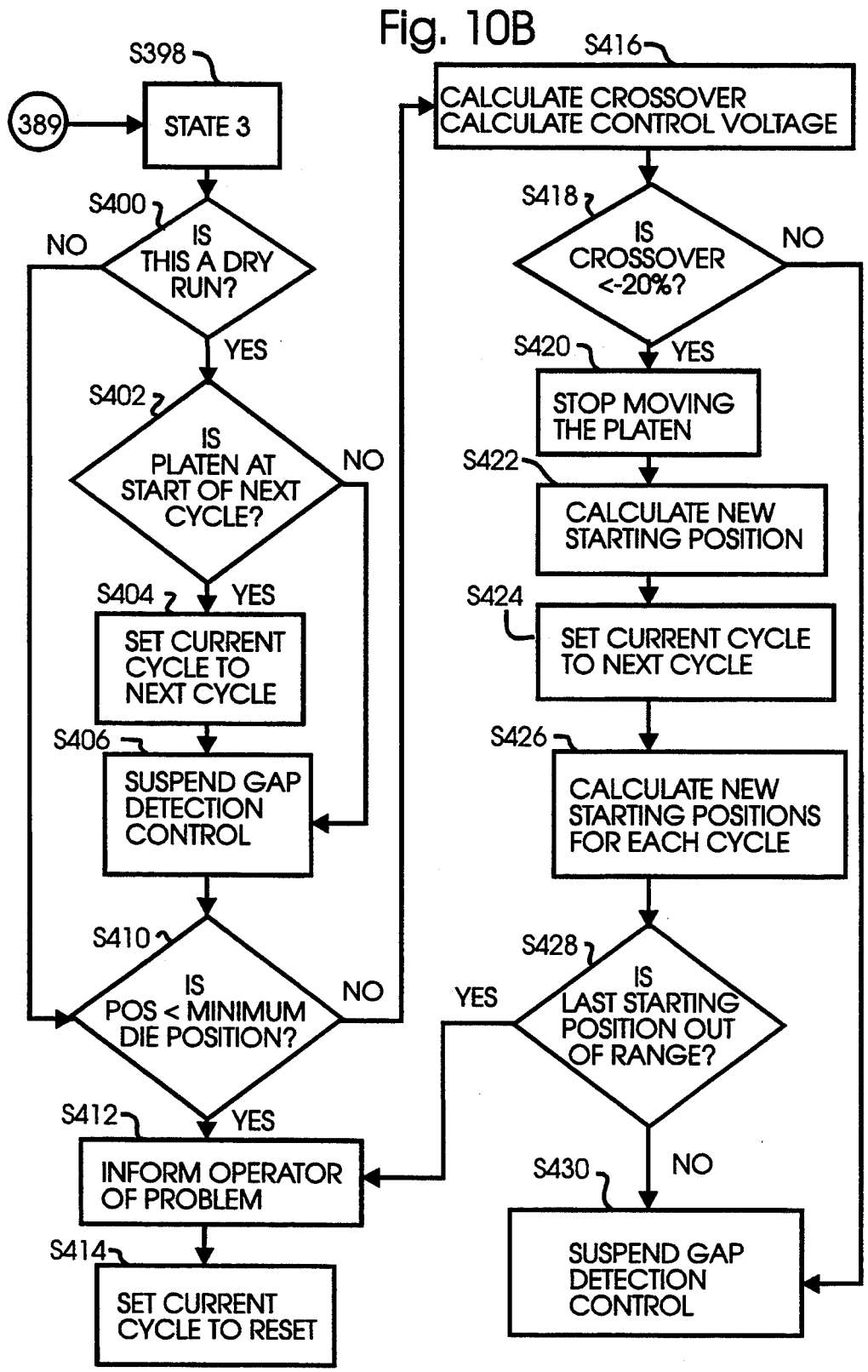

WELDING ASSURANCE CONTROL TECHNIQUES

FIELD OF THE INVENTION

This invention is directed to welding techniques, and is more particularly directed to techniques for controlling flash butt welding automatically.

BACKGROUND OF THE INVENTION

Flash butt welding machines have been known in the past, and there have been attempts to control such welders by analog circuitry. One welding machine employing such an analog circuit is shown in U.S. Pat. No. 4,321,452 entitled "Flash Welders" issued Mar. 23, 1982 in the name of Deffenbaugh. That patent discloses apparatus for detecting whether or not the gap in adjoining ends of a ring-like workpiece to be flash welded is of normal size, or is so much larger as to produce an unsatisfactory weld. However, the apparatus is of limited value because it uses a surge in weld current in order to sense the condition of the weld. In addition, it relies on a comparison with platen motion and on detection of the presence of a weld. These techniques require a substantial period of time in order to stop a defective weld. As a result, improperly welded parts may be stuck together and have to be scrapped.

Accordingly, a primary object of the present invention is to provide improved techniques for assuring that a weld machine is in optimum condition for initiating a welding process, thereby improving the quality and accuracy of the resulting weld.

It is another object of the present invention to provide techniques for automatically and accurately checking whether the tap setting of a weld machine is proper for the part being welded.

Yet another object of the present invention is to provide an accurate technique for calibrating a part before it is welded in order to determine the electrical load presented by the part to the welding transformer.

Still another object of the present invention is to provide techniques for assuring that the ends of a piece to be welded are displaced by a predetermined initial welding distance.

SUMMARY OF THE INVENTION

According to a first aspect of the invention, improved techniques are provided for use in an electric welder that includes a movable platen for carrying a part to be welded and for spacing a first end and a second end of the part. The welder also includes a transformer having a primary winding and a secondary winding electrically coupled to the platen. Tap means are provided for coupling a primary voltage to an adjustable portion of the primary winding. The improved techniques include provision for spacing the first and second ends of the part by at least a predetermined distance, measuring the primary voltage and measuring the secondary voltage across the secondary winding. A first signal is generated having a first value representing a ratio of the primary voltage to the secondary voltage.

Whether the first value lies within a predetermined range of values is determined. If the relationship between the first value and the predetermined range of values is improper, an operator is notified.

A second aspect of the invention is useful in connection with the above-described type of welder in which the tap means varies the effective turns ratio of the primary and secondary windings. More specifically, the improved techniques include a provision for spacing the first end and second end of the part by at least a predetermined distance. The primary voltage and secondary voltage also are measured. A first signal is generated having a first value representing the ratio of the primary voltage to the secondary voltage multiplied by the effective turns ratio. A calibration signal proportional to the first value is then stored, so that the electrical load of the part can be represented for further use in the welding process.

A third aspect of the invention is useful in the above-described type of welder and provides improved techniques for separating the first and second ends of the part by a predetermined initial distance at the beginning of a welding cycle. In such a welder, the techniques include the detection of the primary voltage and secondary voltage, as well as the position of the platen. Provision is also made for opening a gap between the first and second ends of the part and closing the gap until the detected primary voltage and detected secondary voltage indicate that the first and second ends of the part have substantially touched. In response to the substantial touching of the ends, the gap between the platens is measured, thereby ensuring that the part is in a proper position to begin the welding process.

Use of the foregoing techniques offers a significant advantage over the known prior welding techniques. By using the foregoing techniques, high quality welds can be achieved with a degree of accuracy, convenience and speed unobtainable in the past.

BRIEF DESCRIPTION OF THE DRAWINGS

A detailed description of a preferred embodiment of the invention is provided below with reference to the accompanying drawings, wherein the same reference numeral is used to refer to like parts throughout and in which:

FIG. 3 schematically illustrates an exemplary part to be welded as mounted in a conventional platen that is electrically connected to a transformer having a tap made in accordance with a preferred practice of the present invention;

FIGS. 5A–5C illustrate the movement of the weld part and platen shown in FIG. 3 during the gap detection cycle of a preferred mode of the present invention;

FIGS. 10A-10B are flow diagrams illustrating the gap detection cycle of a digital computer program used to control the welder in accordance with a preferred mode of the present invention.

DETAILED DESCRIPTION OF THE PREFERRED EMBODIMENT

Figure 1:
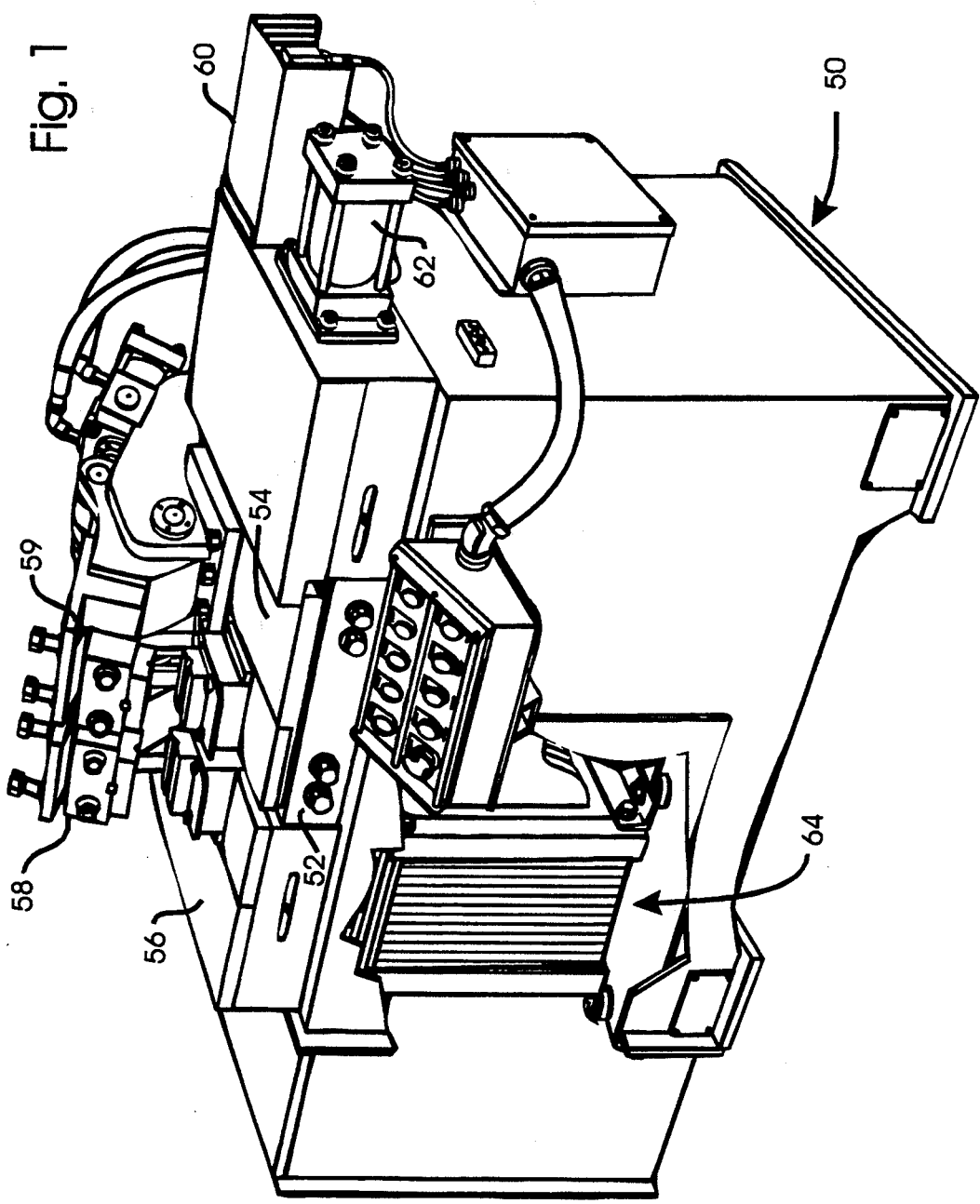
FIG. 1 is a partially fragmentary, perspective view of the mechanical structure of a conventional welding machine which can be adapted for use with the present invention.

Referring to FIG. 1, a conventional welder 50 suitable for use in connection with the present invention comprises a side bar 52, as well as a movable platen 54 and a stationary platen 56 that carry clamps 58 and 59 for holding a part to be welded. Welder 50 also includes a platen position controller 60, an upset cylinder 62 and a transformer 64. Referring to FIG. 3, transformer 64 has a primary winding 66 and a secondary winding 68 that are magnetically coupled by a core 70. Leads 72 and 74 electrically connect secondary winding 68 with platens 54 and 56, respectively. Transformer 64 also includes a tap assembly 76 having a switch 78 that conducts voltage from a 480 volt AC source to various tap conductors 80 connected to primary winding 66. Platens 54 and 56 are adapted to hold a weld part 90 having ends 92 and 94. The weld part may form a ring which conducts current, thereby imposing an electrical load on secondary winding 68.

Figure 2:
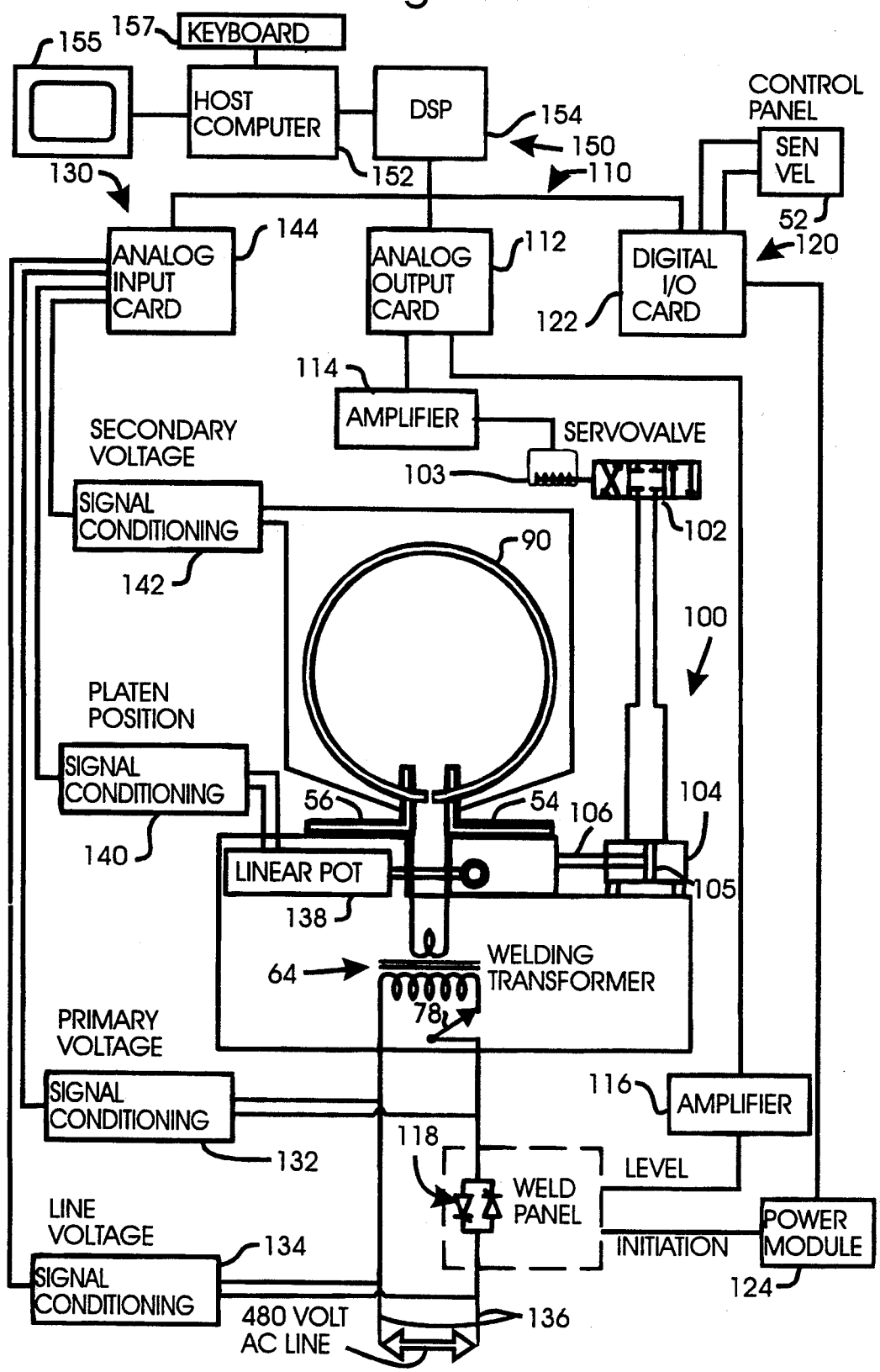
FIG. 2 is an electrical schematic drawing of a preferred form of electrical components made in accordance with the present invention.

Referring to FIG. 2, the movement of platen 54 is controlled by a hydraulic assembly 100 having a servo valve 102 that admits hydraulic fluid to a cylinder 104 in response to an electrical signal applied to a solenoid 103. A piston 105 inside cylinder 104 moves a rod 106 that is mechanically coupled to platen 54. Hydraulic fluid is supplied to valve 102 by a pump 107. System pressure of the hydraulic fluid is measured by a transducer 108.

Referring to FIG. 2, hydraulic assembly 100 is controlled by an analog output system 110 including an analog output card 112 that supplies control signals to an amplifier 114 which drives solenoid 103. Card 112 also supplies control signals to an amplifier 116 that controls the signal level within a weld panel including silicon control rectifiers (SCRs) 118 that control the power conducted to primary coil 66 from 480 volt AC power lines 136.

Referring to FIG. 2, a digital input/output system 120 includes a digital input/output card 122 that provides control signals to a power module 124 that initiates conduction of SCRs 118 at the proper phase of their operating cycle. Side bar 52 (FIG. 1) includes manually adjustable dials SEN and VEL that control the sensitivity and velocity with which platen 54 moves under computer control. The SEN and VEL dials provide digital inputs to card 122 (FIG. 2).

Still referring to FIG. 2, an analog input system 130 comprises a primary voltage signal conditioning circuit 132 that enables the voltage applied to switch 78 to be monitored. System 130 also includes a line voltage signal circuit 134 that enables the voltage of 480 volt AC power line 136 to be monitored. A linear potentiometer 138 is mechanically connected to movable platen 54. The potentiometer varies its resistance in response to movement of platen 54, thereby providing a position-indicating signal to a platen position signal conditioning circuit 140. A secondary voltage signal conditioning circuit 142 enables the monitoring of the voltage cross secondary winding 68 of transformer 64. A transducer signal conditioning circuit 143 enables the monitoring of transducer 108. Each of signal conditioning circuits 132, 134, 140, 142 and 143 provides an output signal to an analog input card 144 that enables the signals to be monitored by a computer system 150 comprising a host computer 152 and a digital signal processor (DSP) 154. Host computer 152 preferably comprises an IBM PC compatible microprocessor with a large hard disk for the storage of data. DSP 154, preferably a processor available from Texas Instruments Company under Model No. TMS320c30, is mounted on a circuit board located within host computer 152. A conventional monitor 155 coupled to computer 152 provides a means of communicating messages to an operator. The operator can respond to the messages via a conventional keyboard 157 coupled to computer 152.

Analog output card 112 preferably is a 16 channel card, whereas input card 144 is preferably a 32 channel card. Digital card 122 preferably has a 32 channel input and a 16 channel output.

Figure 4A:
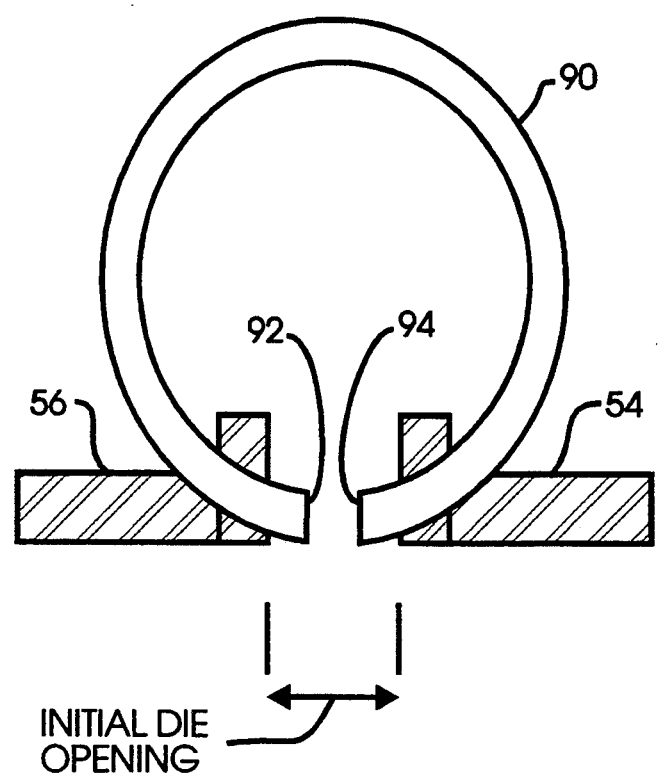
FIGS. 4A–4B illustrate the movement of the weld part and platen shown in FIG. 3 in connection with the part calibration and tap check cycles of a preferred mode of the invention.

The preferred form of the welder operation includes a part calibration cycle that determines the electrical load presented to secondary winding 68 by a part, such as part 90, that conducts current between platens 54 and 56. Before the load can be determined, the platen is moved to ensure that ends 92 and 94 of part 90 are spaced by an appropriate distance. Assuming platens 54 and 56 are displaced by an initial die opening as shown in FIG. 4A, platen 54 is moved in the direction of arrow 156 (FIG. 4B) to a position which is the sum of the initial die opening plus a tap check distance. Before platen 54 is moved, the welder determines whether there is tack weld between ends 92 and 94. If so, weld power is turned on in order to melt the tack weld. Platen 4 then is moved relative to platen 56 to the position shown in FIG. 4B.

The preferred form of the welder operation also includes a tap check cycle in which the accuracy of the setting of switch 78 (FIG. 3) is determined. As a part of the tap check, the tack weld joining ends 92 and 94 (if any) is melted, and platen 54 is moved in the manner previously described to the position shown in FIG. 4B.

The preferred form of the welder operation also includes a gap detection cycle which ensures that ends 92 and 94 of part 90 are displaced by a predetermined initial distance before beginning a weld cycle. The movement of platen 54 during gap detection is explained in connection with FIGS. 5A-5C. As shown in FIG. 5A, end points 92 and 94 are displaced by moving platen 54 to the same position shown in FIG. 4B which provides an initial starting gap between platens 54 and 56. Platen 54 is then moved in the direction of arrow 158. The progress of the movement is illustrated in FIG. 5B. At some point in time, ends 92 and 94 will touch as shown in FIG. 5C. By monitoring the primary and second voltages, the welder can determine the position of platen 54 when ends 92 and 94 have substantially touched. At that point in time, the system measures the separation of platens 54 and 56 and calculates various positions of platen 54 needed to properly complete a weld of ends 92 and 94. The part calibration, tap check and gap detection cycles are important features that enable the welding process to proceed with a degree of speed, accuracy and reliability previously unattainable.

Host computer 152 operates the welder system under control of a program that is described in FIGS. 6-10.

Figure 6:
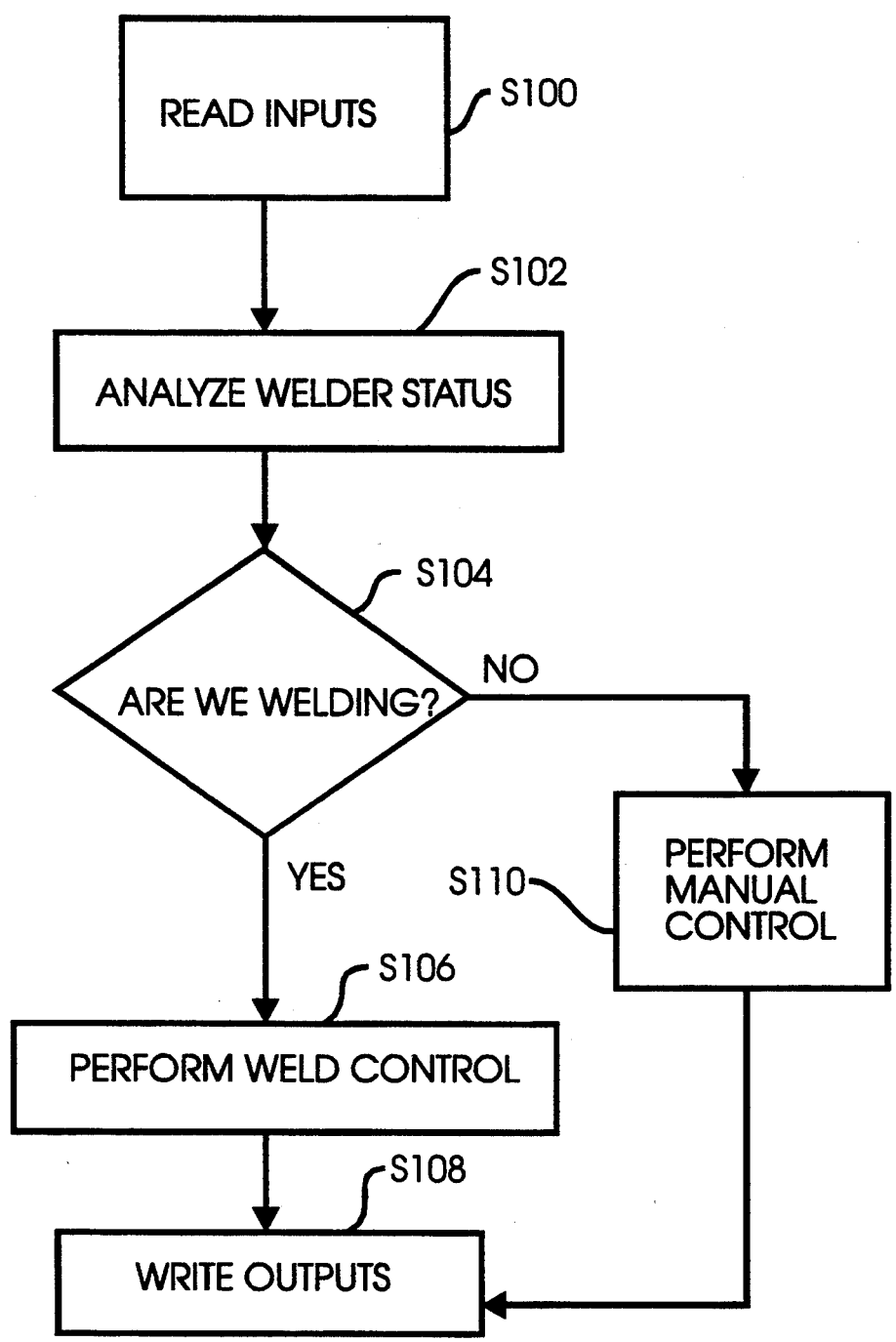
FIG. 6 is a flow diagram illustrating the welder control hierarchy of a digital computer program used to control the welder in accordance with a preferred mode of the present invention.

FIG. 6 illustrates the welder control hierarchy that is used throughout the more detailed steps of the program. The basic loop through which the program proceeds starts by reading inputs from analog input card 144 through DSP 154 in step S100. During step S100, the absolute value (SEC) of the measured voltage across secondary winding 68 is stored and the absolute value (CMD) of the measured voltage across primary winding 66 also is stored. The program then analyzes the welder status in response to the inputs from both analog input card 144 and digital I/O card 122. In step S104, the program determines whether a welding operation is in progress. If so, the program performs the weld control described in more detail in FIGS. 7-10. After the weld control portion of the program is completed, in step S108, outputs are written to analog output card 112 and digital I/O card 122. If no weld is currently being performed in step S110, the program conducts various elementary control operations in response to inputs from an operator.

Figure 7:
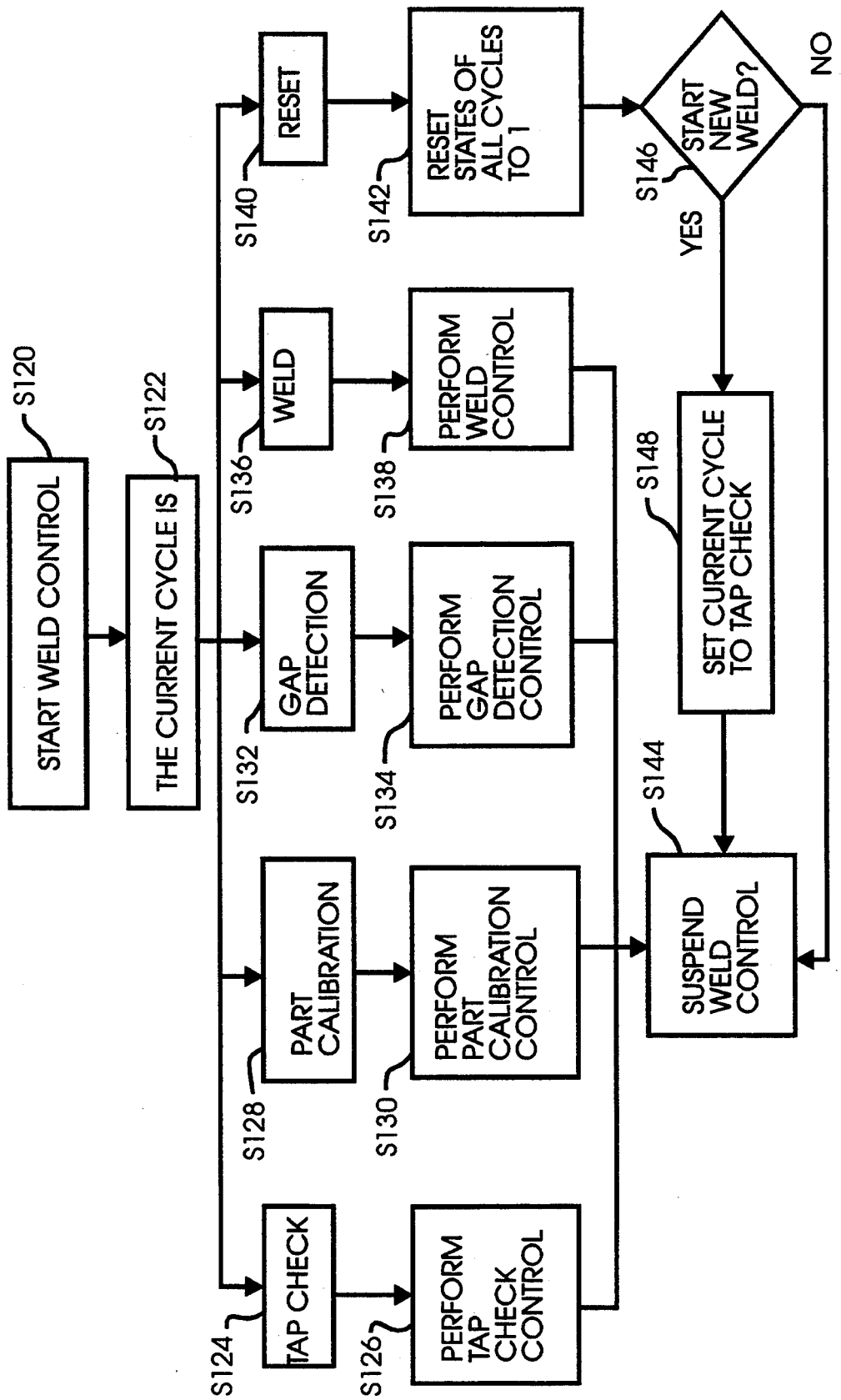
FIG. 7 is a flow diagram illustrating the select welder cycle logic of a digital computer program used to control the welder in accordance with a preferred mode of the present invention.

Entry by the program into step S106 results in the performance of the steps shown in FIG. 7 beginning with step S120. In response to beginning the weld control in step S120, the current cycle is determined in step S122. In steps S124-S134, the tap check, part calibration and gap detection cycles are performed as previously described. In steps S136 and S138, parts are welded together under control of the program. In steps S140 and S142, the states of all cycles are reset to 1. After the resetting operation is performed, step S146 determines whether a new weld is to be started. If not, weld control is suspended in step S144. If a new weld is to be started, in step S148, the current cycle is set to tap check step S124.

Part calibration steps S128 and S130 are normally called from step S126. Since part calibration is frequently performed as a part of the tap check cycle, part calibration will be explained in detail before tap check is described.

Figure 4B:
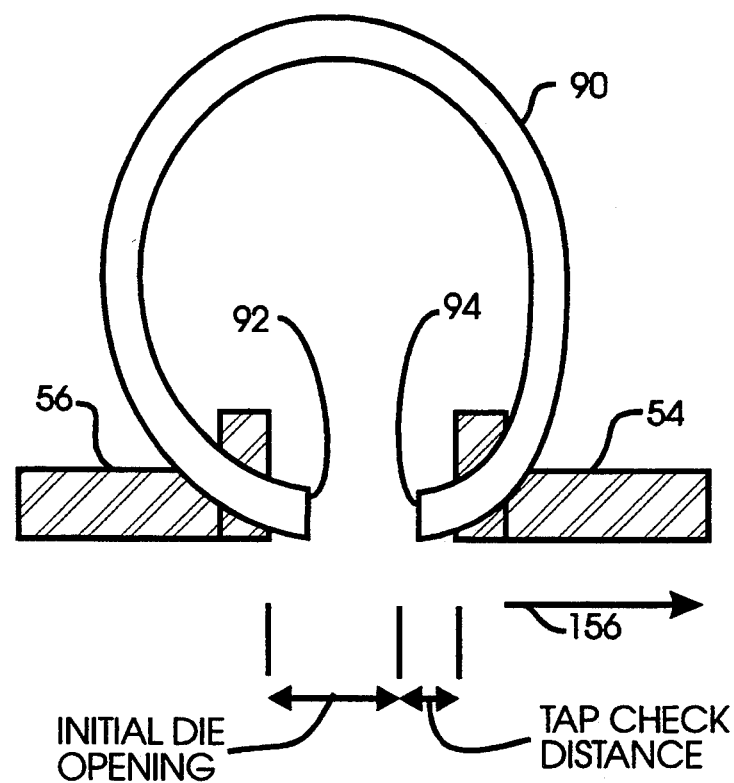
Figure 8A:
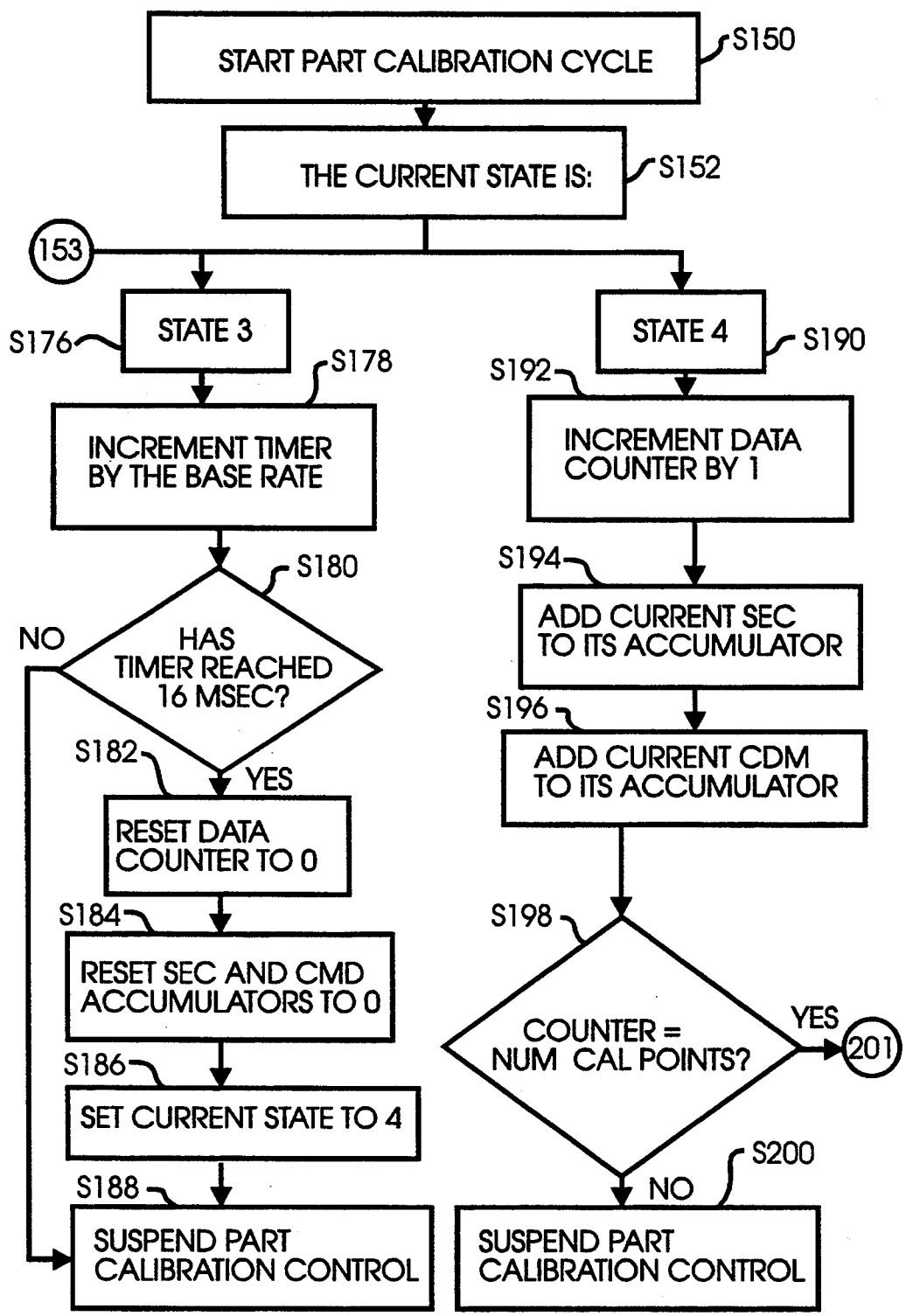
FIGS. 8A–8C are flow diagrams illustrating the part calibration cycle of a digital computer program used to control the welder in accordance with a preferred mode of the present invention.

Referring to FIG. 8A, the part calibration cycle begins with step S150 and continues to step S152 wherein the current state is determined. If the current state is 1, the program proceeds through node 153 to step S154 of FIG. 8C. The program then proceeds to step S156 in which the first valid welding cycle is determined. During this step, the initial die opening is retrieved from memory, and platens 54 and 56 are in the position shown in FIG. 4A. The tap check distance shown in FIG. 4B is also retrieved from memory and, in step S158, the program directs platen 54 to start moving to the tap check position shown in FIG. 4B. Movement is in the direction of arrow 156. In step S160, the current state of the program is set to 2 and, in step S162, the part calibration control is suspended while the processing shown in FIG. 6 is performed.

Figure 8B:
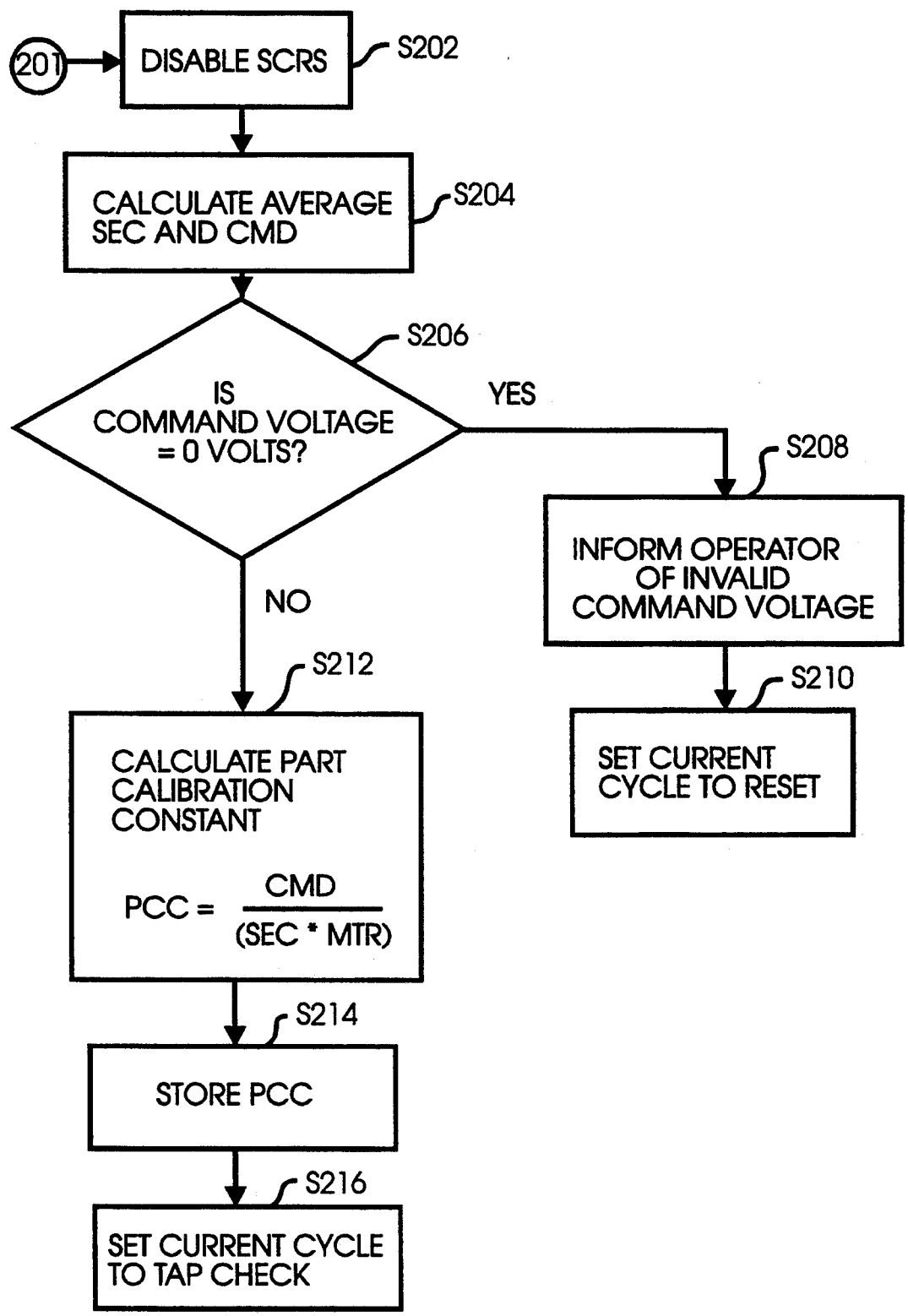
Figure 8C:
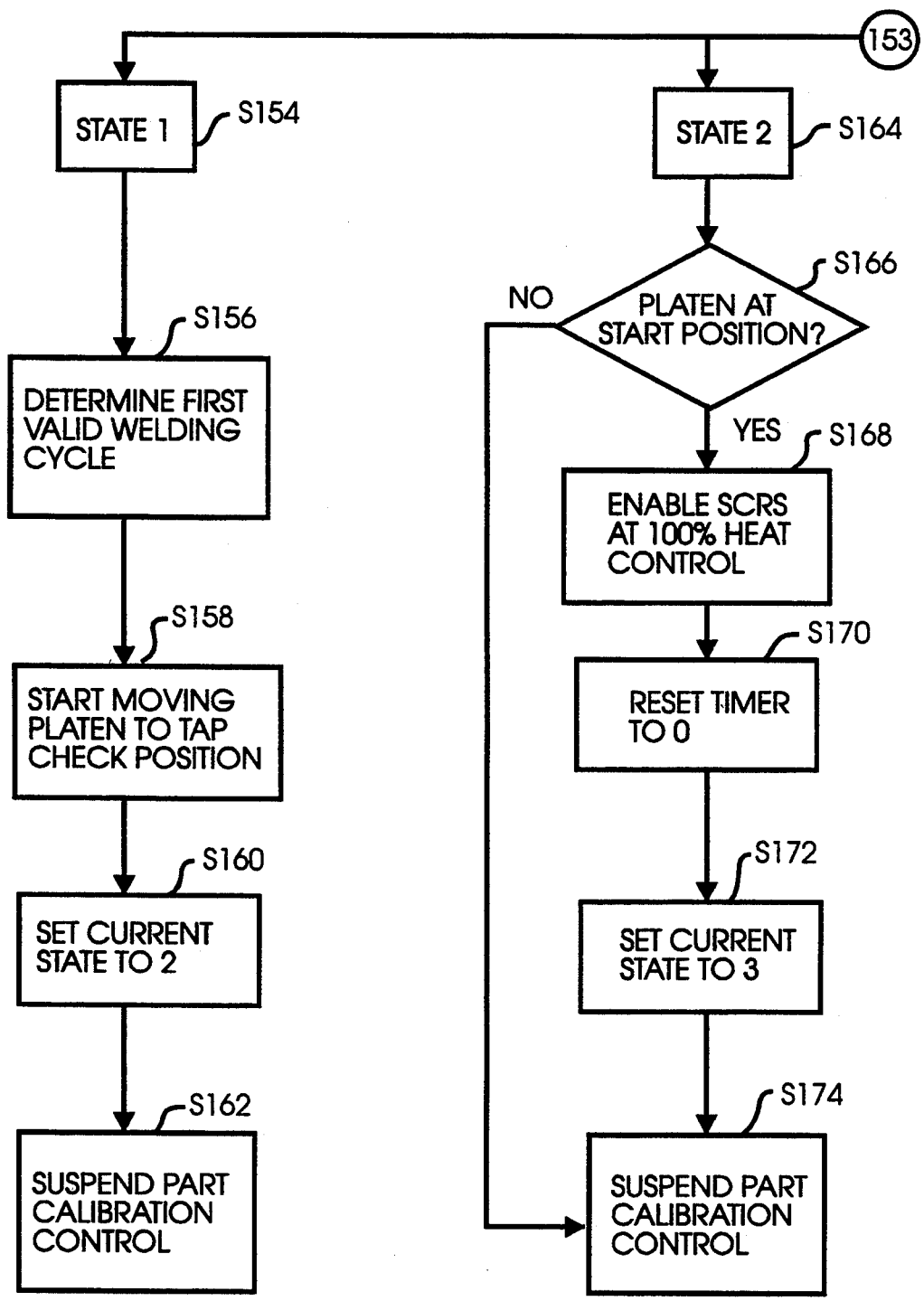

The program then proceeds to state 2, step S164 shown in FIG. 8C. In step S166, the program checks to see that platen 54 is in the position shown in FIG. 4B. If the position is correct, in step S168, SCRs 118 (FIG. 2) are adjusted to conduct maximum current. In step S170, a software timer is reset to zero, and in step S172, the current state is set to 3. Then part calibration control is suspended in step S174. Whenever a step indicates that control is suspended, the program returns to execute the procedure shown in FIG. 6 which continues to step S106. During step S106, the program reenters the next appropriate step in FIGS. 8-10. The steps shown in FIG. 6 occur about every 1 millisecond. The program then proceeds to step S176 (FIG. 8A). In step S178, the software timer is incremented by the base rate. The base rate preferably equals 1 millisecond. In step S180, the program determines whether the timer has reached 16 milliseconds to ensure that a 60 Hz cycle has been completed. If the cycle had been completed, in step S182, a software data counter is set to zero, and in step S184, the SEC and CMD accumulators are set to zero. The SEC accumulator accumulates values of the voltage across secondary winding 68 (FIG. 3) and the CMD accumulator accumulates values of primary voltage across winding 66 (FIG. 3). In step S186, the current state is set to 4, and in step S188, part calibration control is suspended. The program then proceeds to the state 4, step S190 (FIG. 8A). In step S192, the software data counter reset in step S182 is incremented by one. In step S194, the current value of SEC is added to the SEC accumulator, and in step S196, the current value of the primary voltage (CDM) is added to the CMD accumulator. In step S198, the program determines whether the data counter equals the variable NUM CAL POINTS. According to the preferred practice, NUM CAL POINTS equals 100. If the data counter has not yet been incremented to 100, part calibration control is suspended in step S200. If the data counter equals 100 in step S198, the program proceeds through node 201 to step S202 (FIG. 8B) in which SCRs 118 are disabled and cease to conduct current. In step S204, the program separately calculates the average secondary (SEC) voltage and average primary (CMD) voltage. The averages are calculated by dividing the value in the respective accumulators by the NUM CAL POINTS value (e.g., 100). In step S206, the program determines whether the primary voltage (COMMAND or CMD) is zero. If so, the operator is informed on monitor 155 of an error in step S208 and the current cycle is set to reset in step S210. Reset is shown in FIG. 7.

If the primary (CMD) voltage is not zero, then the part calibration constant (PCC) is calculated in step S212. The values CMD and SEC shown in the equation in step S212 are the average SEC and average CMD calculated in step S204. The term MTR is the machine turns ratio which is the ratio of primary turns electrically connected into the circuit by switch 78 (FIG. 3) to the number of turns of secondary winding 68. In step S214, the part calibration constant (PCC) is stored in memory. In step S216, the current cycle is set to tap check.

Figure 9A:
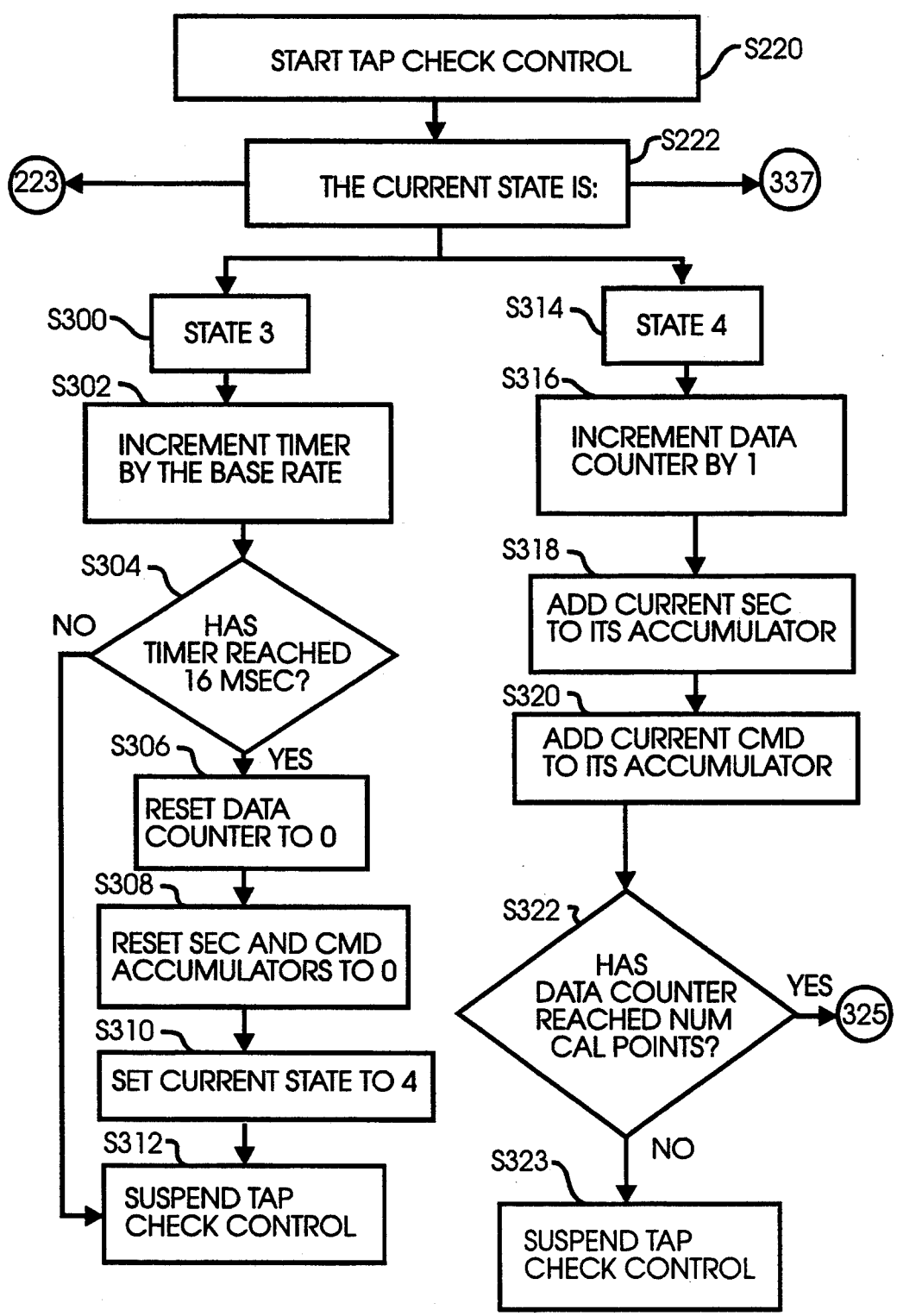
FIGS. 9A-9F are flow, diagrams illustrating the tap check control cycle of a digital computer program used to control the welder in accordance with a preferred mode of the present invention.
Figure 9B:
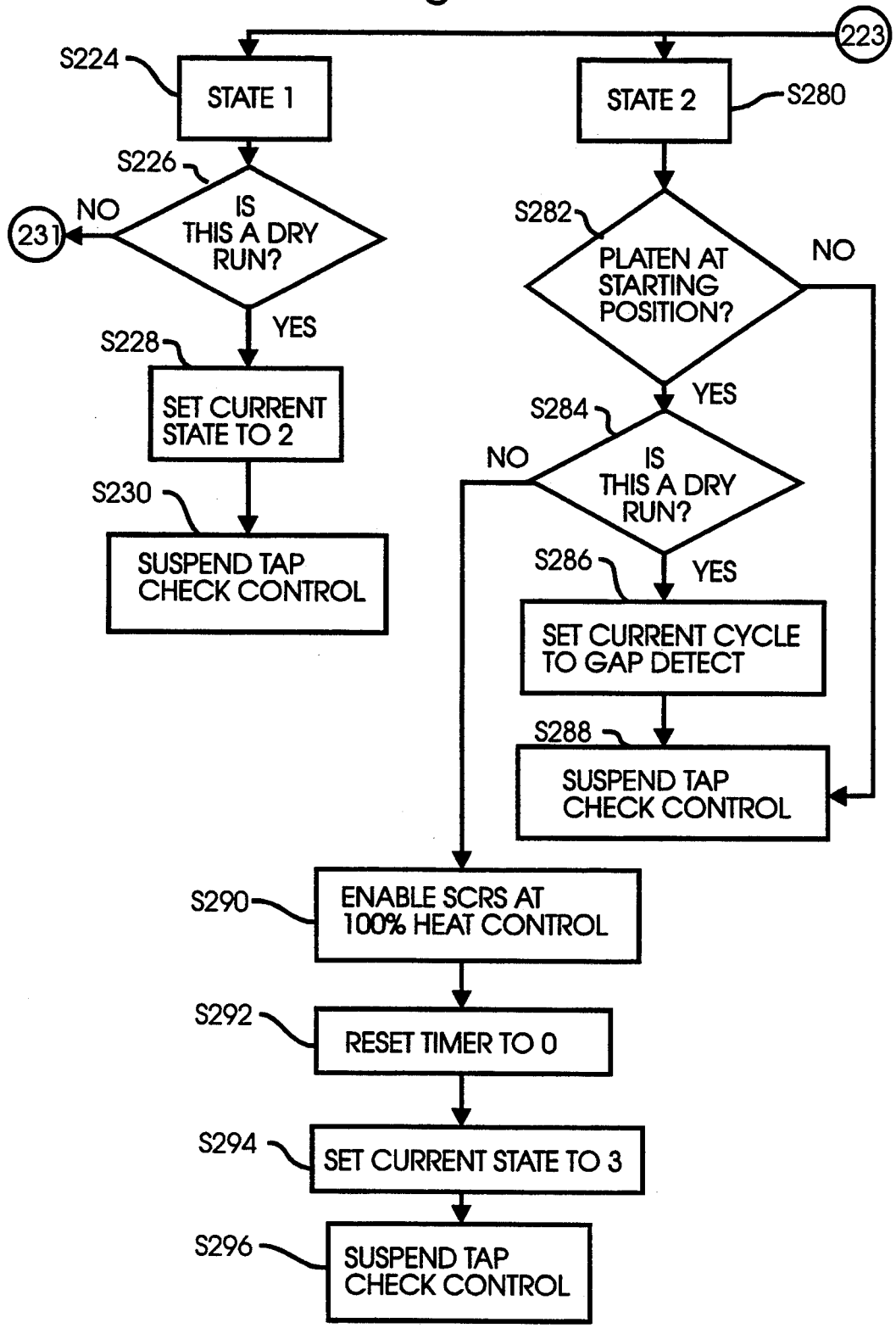

In the event the current cycle is set to tap check in step S216, the program proceeds to step S220 shown in FIG. 9A. In step S222, the current state is determined. If the current state is 1, the program proceeds through node 223 to step S224 shown in FIG. 9B. In step S226, the program determines whether welding is actually to be accomplished or whether this is a test procedure (i.e., a dry run). If it is a dry run, the current state is set to 2 in step S228, and the tap check control is suspended in step S230.

Figure 9C:
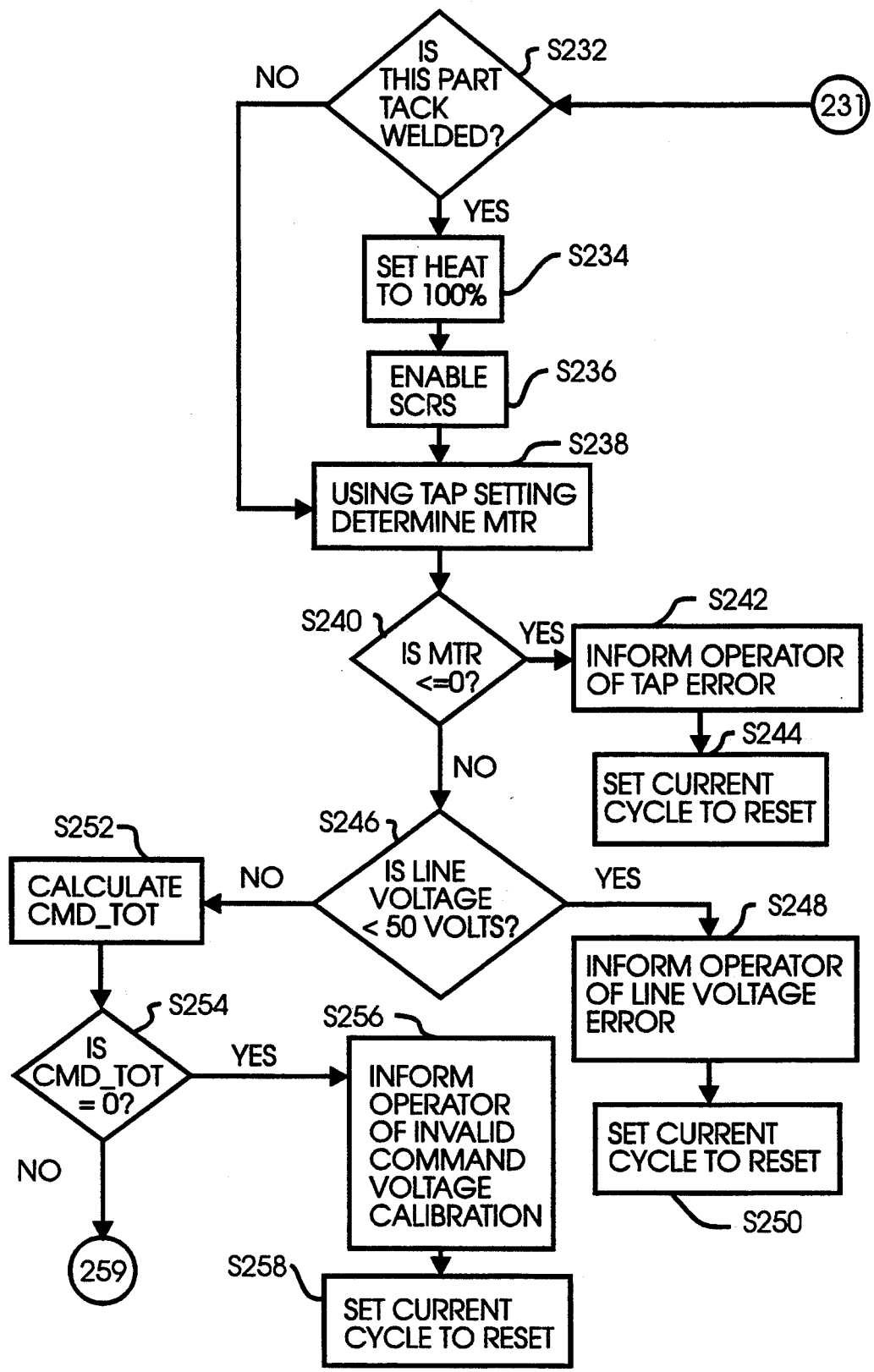

If step S226 determines that the procedure is not a dry run, the program proceeds through node 231 to step S232 shown in FIG. 9C. In step S232, the program determines whether part 90 is tack welded. If so, in step S234, SCRs 118 are adjusted to conduct maximum current, and in step S236, the SCRs are enabled. In step S238, the tap setting of switch 78 (FIG. 3) is used by the program to determine the machine turns ratio (MTR) previously explained. If MTR is less than or equal to zero, the operator is informed on monitor 155 of a tap switch error in step S242, and the current cycle is set to reset (FIG. 7) in step S244. If MTR is not equal to or less than zero, the program determines whether the line voltage on line 136 (FIG. 2) is less than 50 volts. If so, the operator is informed on monitor 155 of a line voltage error in step S248, and the current cycle is set to reset (FIG. 7) in step S250. If the line voltage is equal to or greater than 50 volts, in step S252, the maximum primary voltage across winding 66 (FIG. 3) which the system is capable of reading via input card 144 is determined and is assigned a value in variable CMD_TOT. In step S254, if CMD_TOT equals zero, the operator is informed on monitor 155 of an invalid command voltage calibration in step S256, and the current cycle is set to reset (FIG. 7) in step S258.

Figure 9D:
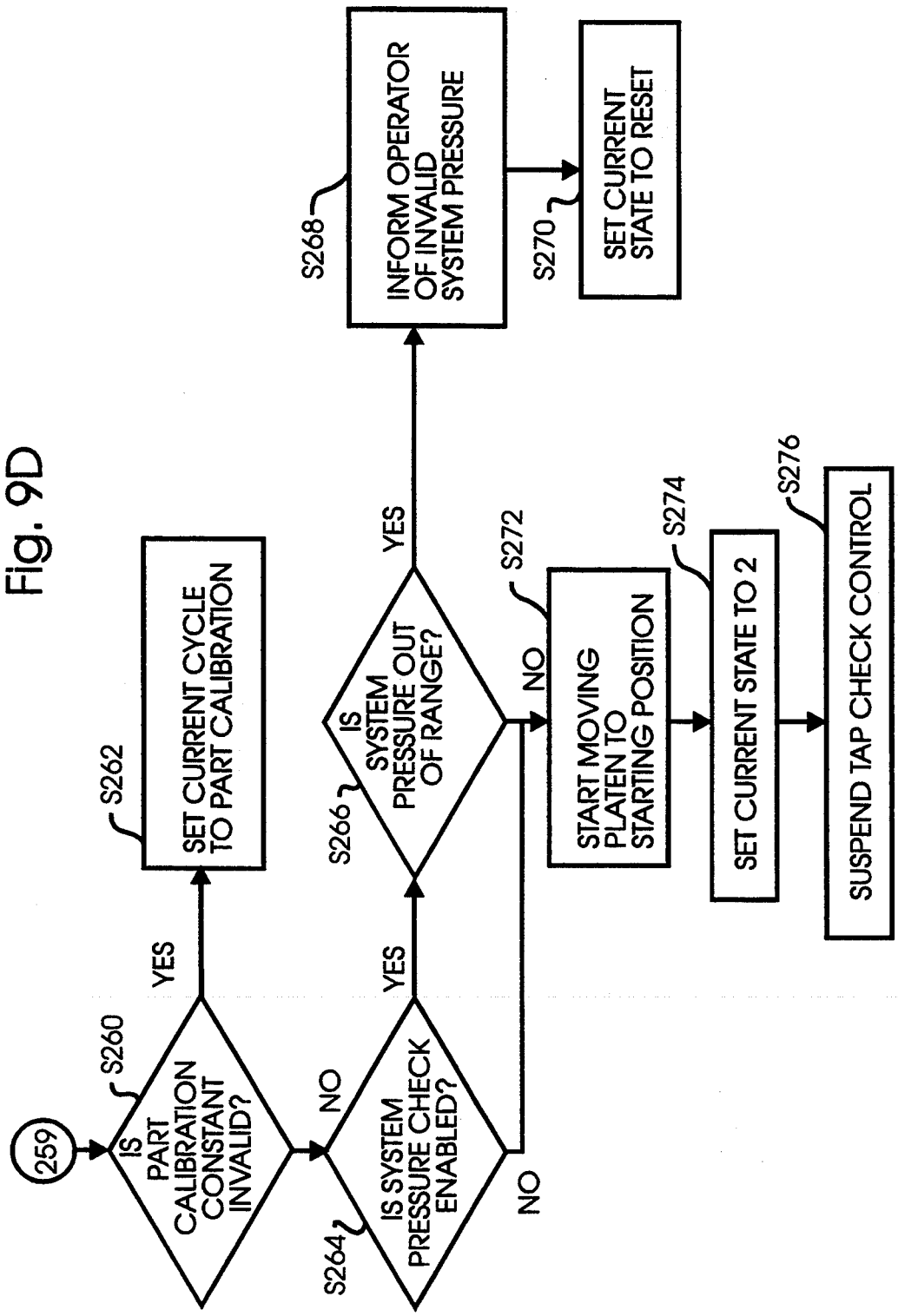

If CMD_TOT is not equal to zero, the program proceeds through node 259 to step S260 shown in FIG. 9D. If the part calibration constant is invalid according to step S260, then the current cycle is set to part calibration in step S262 (FIG. 7), and the procedure previously described in connection with FIGS. 8A–8C is initiated. If the part calibration constant is valid, the program checks the system pressure of the hydraulic fluid (FIG. 2) in step S264. The pressure is read through a pressure transducer 108 (FIG. 2) that provides an input to analog input card 144 (FIG. 2).

If the system pressure of the hydraulic fluid is out of the proper range as determined in step S266 (FIG. 9D), the operator is informed on monitor 155 of an invalid system pressure in step S268, and the current state is set to reset (FIG. 7) in step S270. If the pressure is within an acceptable range, platen 54 is moved in the direction of arrow 156 to the starting position shown in FIG. 4B under the control of step S272. The current state is then set to 2 in step S274, and tap check control is suspended in step S276. The program then proceeds to the state 2, step S280, shown in FIG. 9B. In step S282, the program determines whether platen 54 is in the starting position shown in FIG. 4B. In step S284, the program determines whether this procedure is a dry run. If so, the current cycle is set to gap detect (FIG. 7) in step S286, and tap check control is suspended in step S288.

If the procedure is not a dry run, SCRs 118 (FIG. 2) are enabled to conduct maximum current in step S290, and the timer is reset to zero in step S292. The current state is then set to 3 in step S294, and tap check control is suspended in step S296.

Following steps S294 and S296, the program proceeds to state 3, step S300, shown in FIG. 9A. In step S302, the timer is incremented by the base rate. Step S304 determines whether the timer has reached 16 milliseconds to ensure that a 60 Hz cycle has been completed. If so, the data counter is reset to zero in step S306, and the SEC and CMD accumulators (previously described) are reset to zero in step S308. The current state is set to 4 in step S310, and tap check control is suspended in S312.

As shown in FIG. 9A, after entering state 4, step S314, the data counter is incremented by 1 in step S316. In step S318, the current value of SEC is added to its accumulator, and in step S320, the current CMD value is added to its accumulator. In step S322, the program determines whether the count in the data counter (step S316) equals NUM CAL POINTS. Further information about these steps shown in FIG. 9A can be obtained by reference to the description of the related steps shown in FIG. 8A, previously described. If the answer to step S322 is no, tap check control is suspended in step S323.

Figure 9E:
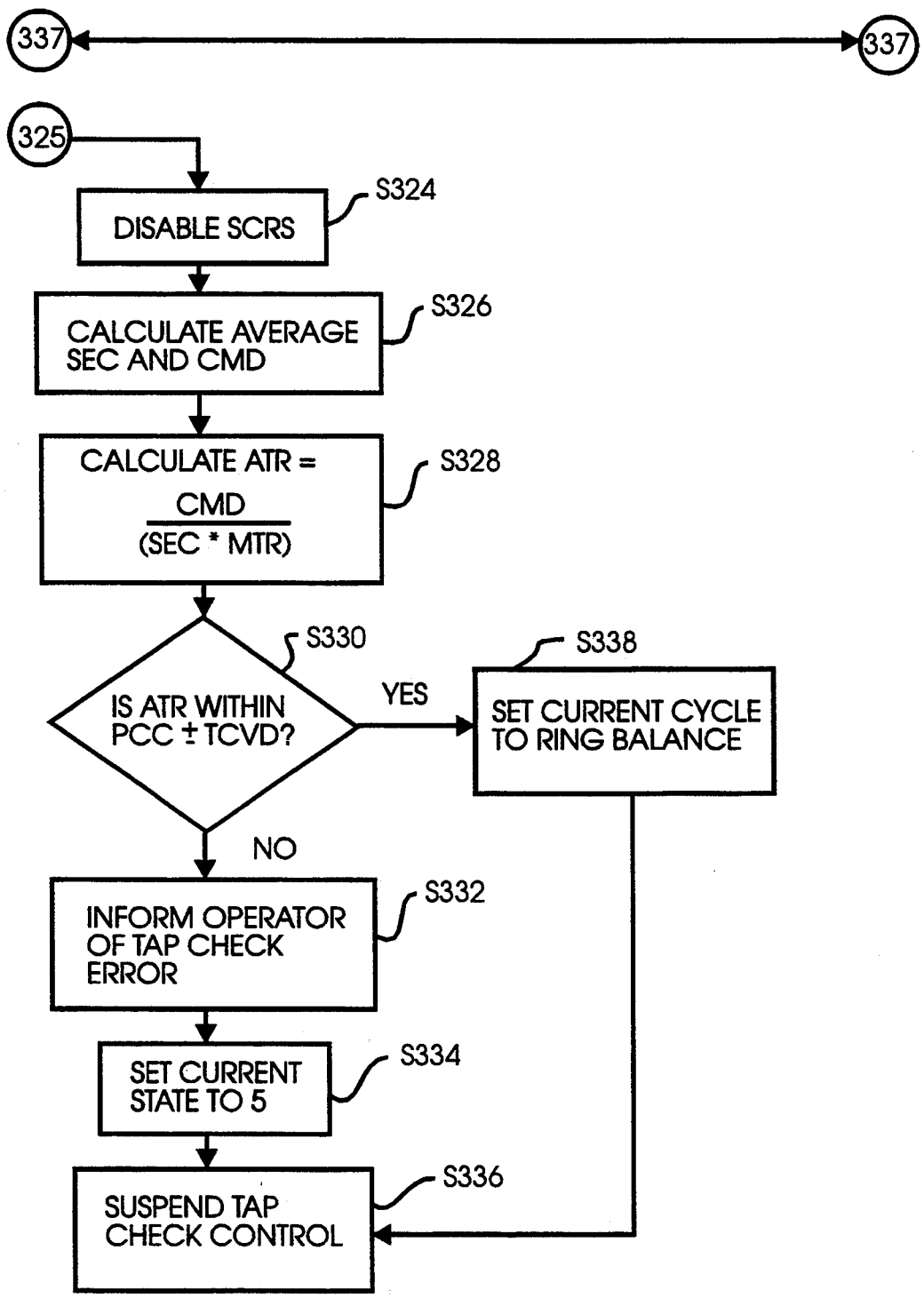

If the answer to step S322 is yes, the program proceeds through node 325 to step S324 shown in FIG. 9E. In step S324, SCRs 118 (FIG. 2) are disabled and ceased to conduct current. In step S326, the average SEC and CMD voltage values are calculated as in step S204 (FIG. 8B). In step S328, the apparent turns ratio (ATR) is calculated according to the illustrated formula wherein the values have the definitions previously explained. In step S330, the program determines whether ATR is outside of a tap check voltage deadband (TCVD). In other words, ATR must be within the following range:

$$PCC - TCVD < = ATR < = PCC + TCVD.$$

If ATR is within the prescribed range, then the current cycle is set to a ring balance cycle in step S338. The object of the ring balance cycle is to determine ring balance as a function of heat control so that heat control can be adjusted during the weld without creating errors in the control equations.

If ATR is outside the prescribed range, the operator is informed on monitor 155 of a tap check error in step S332, and the current state is set to 5 in step S334. Tap check control then is suspended in step S336. The program can also enter step S336 from step S338.

Figure 9F:
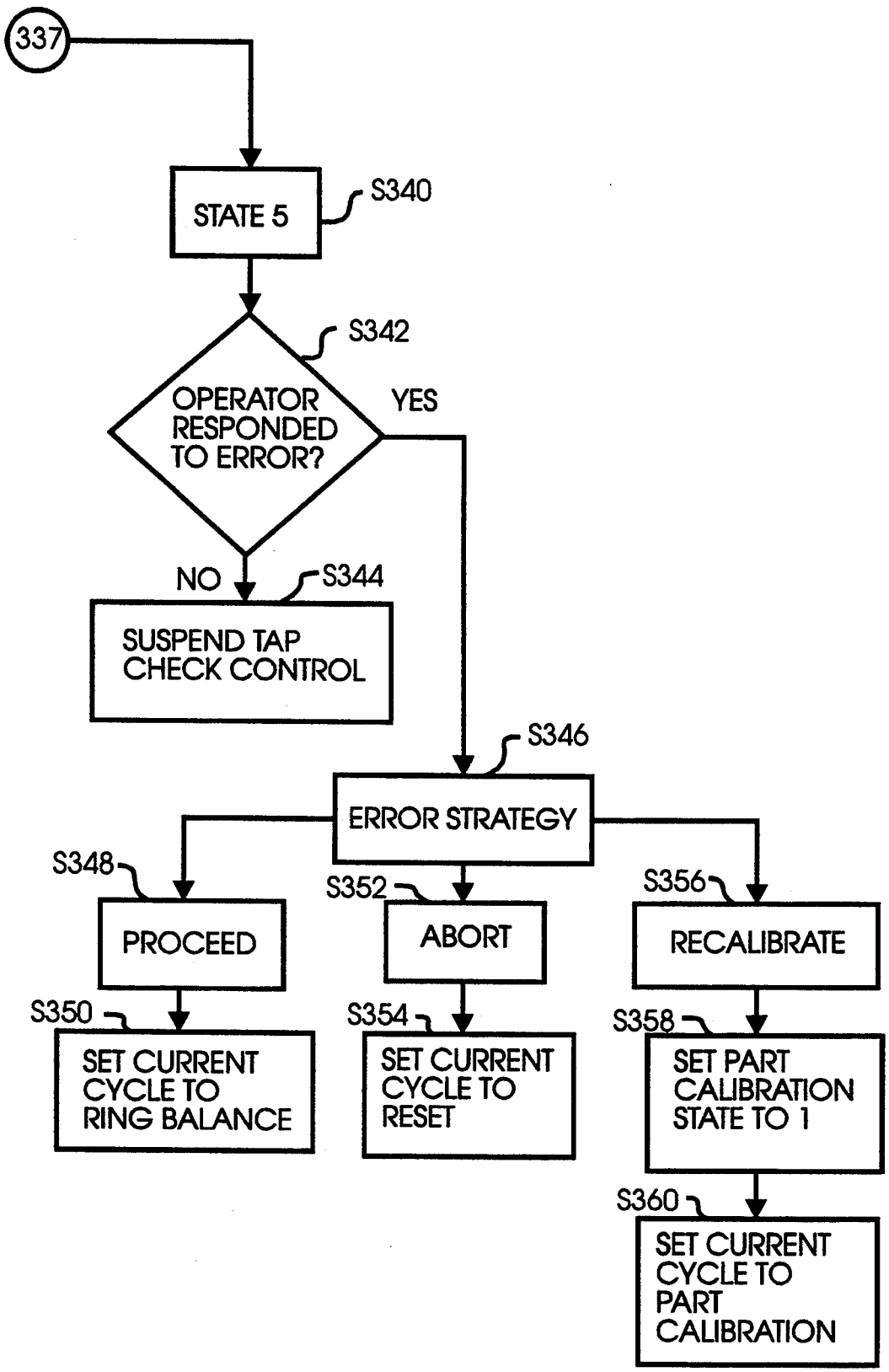

The program enters the state 5, step S340, shown in FIG. 9F through node 337 (FIGS. 9A, 9E and 9F). In step S342, the program looks for a response to the error indicated in step S332 (FIG. 9E) by the operator. If no response is received, tap check control is suspended in step S344. If a response is received, an error strategy step S346 is entered. Depending on the type of response received from the operator over keyboard 157, the program proceeds in step S348 and sets the current cycle to ring balance in step S350. Alternatively, depending on operator response, the procedure may be aborted in step S352, and the current cycle set to reset (FIG. 7) in step S354. As a third alternative, a recalibration step S356 may be entered in which the part calibration cycle state is set to 1 in step S358. The current cycle is set to part calibration in step S360 and the program initiates the part calibration procedure described in connection with FIGS. 8A–8C.

Figure 10A:
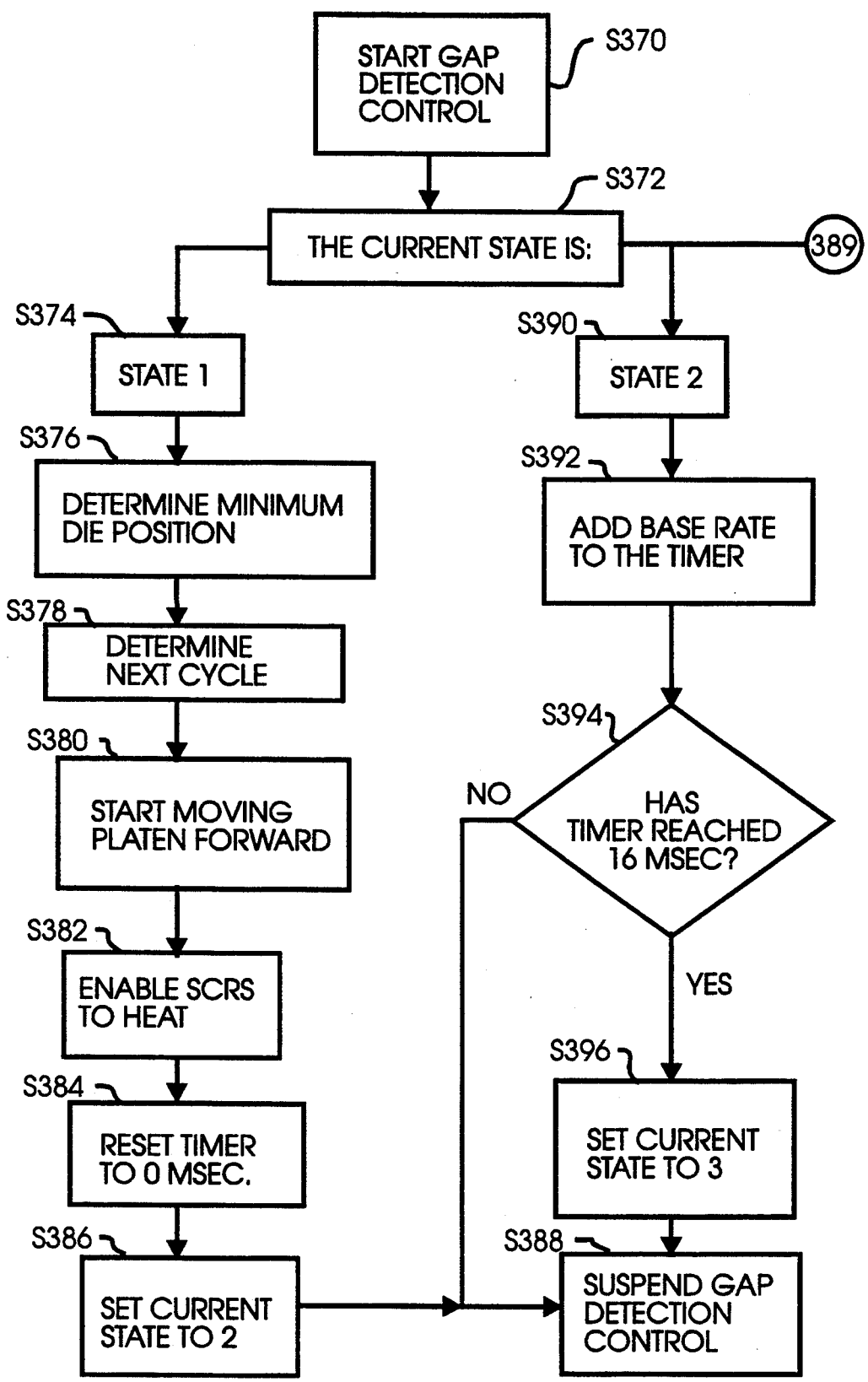

In the event that the current cycle is set to gap detect in step S286 (FIG. 9B), the gap detection control cycle is started in step S370 shown in FIG. 10A. Basically, the gap detection control cycle moves platen 54 forward until it detects that ends 92 and 94 of part 90 are touching (FIG. 5C). Prior to the gap detection cycle, platen 54 was open wider than the initial die opening to perform the tap check and part calibration operations. Therefore, at the beginning of the gap detection cycle, platen 54 is at the initial die position plus the tap check distance shown in FIG. 4B. The same position is shown in FIG. 5A which also indicates that the platens are separated by a starting gap. Platen 54 is then moved in the direction of arrow 158 until ends 92 and 94 substantially touch. The platen position at which ends 92 and 94 touch is designated a new initial position for the weld. All other positions defined in the part settings are adjusted for the new starting position. The difference between the old and new initial die setting is called the bias. The bias is added to all die openings in the part settings stored in computer 152. The welder is then ready to start the first welding cycle.

Referring again to FIG. 10A, state 1 is entered in step S374 and the minimum separation between platens 54 and 56 is determined. If the closure of platens 54 and 56 during the gap detection cycle places them closer together than the minimum distance required for the weld, the cycle is aborted.

In step S378, the next cycle of operation is determined so that the proper variables for conducting gap detection control can be retrieved from memory. In step S380, platen 54 is moved in the direction of arrow 158 (FIG. 5A). In step S382, SCRs 118 are enabled to conduct current so that part 90 is heated. In step S384, the software timer is reset to zero milliseconds. In step S386, the current state is set to 2. Gap detection control is then suspended in step S388.

After the suspension, the program proceeds to state 2, step S390. In step S392, the base rate is added to the timer that was reset in step S384. In step S394, the program determines whether the timer has reached 16 milliseconds in order to ensure that a 60 Hz cycle has been completed. If the cycle has been completed, the current state is set to 3 in step S396 and gap detection control is again suspended in step S388. State 3, step S398, next is entered through node 389 shown in FIG. 10B. In step S400, the program determines whether the current procedure is a dry run. If so, the program determines whether platen 54 is at an appropriate position for the start of the next cycle in step S402. If so, the program is set to the next cycle in step S404, and gap detection control is suspended in step S406. Gap detection control also is suspended if step S402 determines that platen 54 is not in the proper position to start the next cycle. In step S410, the program determines whether the space between platens 54 and 56 is less than the minimum position required for a weld. If so, the operator is informed on monitor 155 of the problem in step S412, and the current cycle is set to reset in step S414. If platens 54 and 56 are separated by more than the minimum spacing, a crossover value is calculated in step S416:

$$CROSSOVER = SEC\_PER * -200$$

The SEC_PER term in the CROSSOVER equation is calculated as follows:

$$SEC\_PER = |(CMD-(SEC*BAL*MTR))|/CMD\_TOT$$

During step S416, the nonabsolute values of SEC and CMD preferably are used.

The BAL term is a function of the heat setting which adjusts for the nonlinearity of the transformer at different settings. In order to determine BAL, the computer sets the heat control to 0%, enables SCRs 118, waits for 16 milliseconds to ensure a 60 Hz cycle has been completed, and averages the measured secondary (SEC) and command (CMD) voltages over a 100 values or samples. The balance term for the heat control is calculated by dividing the command voltage by the quantity secondary voltage times the machine turns ratio: $BAL = CMD/(SEC * MTR)$. The BAL value associated with a heat setting is saved for the remainder of the weld. The heat control is then set to the next heat setting and the balance is again calculated. The process is repeated until the balance values for 0 through 100% heat control are defined.

In step S416, a control voltage (CV) value also is calculated:

$$CV = (CROSSOVER * SEN) + (VEL\_PER*VEL)$$

The VEL PER term is calculated as follows:

$$VEL\_PER = (|(SEC * MTR)|/CMD\_TOT) * 100$$

The SEN and VEL terms are adjusted by the operator based on the control panel SEN and VEL dials (FIG. 2). CV is proportional to the signal sent to solenoid 103 to control the direction and speed of platen 54. CV can be positive or negative.

VEL_PER is proportional to rate at which platen 54 moves in the direction of arrow 158 (FIGS. 5A and 5B). SEC_PER is proportional to the rate at which platen 54 moves in the direction opposite arrow 158. SEC_PER ranges from 0 to 1. When ends 92 and 94 are not touching, SEC*BAL*MTR approximately equals CMD and both SEC_PER and CROSSOVER are small. When ends 92 and 94 substantially touch (FIG. 5C), SEC goes to substantially zero, SEC_PER becomes larger, and CROSSOVER becomes a large negative number.

In step S418, the program determines whether the value crossover is less than minus 20%. If so, it is an indication that ends 92 and 94 of part 90 are substantially touching. If they are substantially touching, the program stops moving platen 54 in step S420. A new starting position is then calculated in step S422 by reading the value of linear potentiometer 138 (FIG. 2) which indicates the position of platen 54 when ends 92 and 94 are substantially touching. In step S424, the current cycle is set to the next cycle of operation. In step S426, new starting positions (e.g., initial weld distances) for each subsequent welding cycle are calculated based on the position of platen 54 when ends 92 and 94 were substantially touching. In step S428, the program determines whether any of the newly calculated starting positions are out of appropriate range. If so, the operator is informed on monitor 155 of the problem in step S412. If not, gap detection control is suspended in step S430. At this point in time, the program is ready to initiate the actual welding of part 90 and it proceeds to weld step S136 shown in FIG. 7. The speed of movement of platen 54 is determined by the CV term calculated in step S416. In step S138, ends 92 and 94 of part 90 are welded together. Since the proper setting of tap switch 78 was assured by the tap check cycle, and since the proper initial weld distance between ends 92 and 94 was assured by the gap detection cycle, the accuracy of the weld is substantially enhanced.

Those skilled in the art recognize that the preferred embodiments described in the specification may be altered and modified without departing from the true spirit and scope of the invention as defined in accompanying claims.

We claim:

1. In an electrical welder including a movable platen for carrying a part to be welded and for spacing a first end and a second end of said part, a transformer having a primary winding and having a secondary winding electrically coupled to said platen, and tap means for coupling a primary voltage to an adjustable portion of said primary winding, improved apparatus for ensuring that said tap means is correctly adjusted for the welding of said part comprising in combination:

means for spacing said first and second ends of said part by at least a predetermined distance;

means for measuring said primary voltage and said secondary voltage;

means for generating a first signal having a first value proportional to the ratio of the primary voltage to the secondary voltage and for determining whether said first value lies within a predetermined range of values; and means for indicating to an operator the presence of said first value in relation to said predetermined range.

2. Apparatus, as claimed in claim 1, wherein said means for spacing comprises:

means for burning a tack weld from said part; and means for moving said platen through a predetermined distance in order to ensure that said first and second ends of said part are separated by at least said predetermined distance.

3. Apparatus, as claimed in claim 1, wherein said means for measuring comprises means for accumulating a predetermined number of values of said primary voltage and said secondary voltage and for averaging said predetermined number of values of said primary voltage and said secondary voltage.

4. Apparatus, as claimed in claim 3, wherein said means for measuring further comprises means for delaying for at least substantially one cycle of said primary voltage before accumulating said predetermined number of values of said primary voltage and said secondary voltage.

5. Apparatus, as claimed in claim 3, wherein said means for generating comprises means for calculating the ratio of said average primary voltage to said average secondary voltage multiplied by a calibration constant representing the electrical load of said part.

6. In an electrical welder including a movable platen for carrying a part to be welded and for spacing a first end and a second end of said part, a transformer having a primary winding and having a secondary winding electrically coupled to said platen, and tap means for coupling a primary voltage to an adjustable portion of said primary winding, an improved process for ensuring that said tap means is correctly adjusted for the welding of said part comprising in combination the steps of:

spacing said first and second ends of said part by at least a predetermined distance;

measuring said primary voltage and said secondary voltage;

generating a first signal having a first value representing the ratio of the primary voltage to the secondary voltage corrected for the electrical load of said part;

determining whether said first value lies within a predetermined range of values; and indicating to an operator the presence of said first value in relation to said predetermined range.

7. A process, as claimed in claim 6, wherein said step of spacing comprises the steps of:

burning a tack weld from said part; and moving said platen through a predetermined distance in order to ensure that said first and second ends of said part are separated by at least said predetermined distance.

8. A process, as claimed in claim 6, wherein said step of measuring comprises the steps of:

accumulating a predetermined number of values of said primary voltage and said secondary voltage; and averaging said predetermined number of values of said primary voltage and said secondary voltage.

9. A process, as claimed in claim 8, wherein said step of measuring further comprises the step of delaying for at least substantially one cycle of said primary voltage before accumulating said predetermined number of values of said primary voltage and said secondary voltage.

10. A process, as claimed in claim 8, wherein said step of generating comprises the step of calculating the ratio of said average primary voltage to said average secondary voltage multiplied by a calibration constant representing the electrical load of said part.

11. In an electrical welder including a movable platen for carrying a part to be welded and for spacing a first end and a second end of said part, a transformer having a primary winding and having a secondary winding electrically coupled to said platen, and tap means for varying the effective turns ratio of said primary and secondary windings, improved apparatus for representing the electrical load presented to said secondary winding by said part comprising in combination:

means for spacing said first end and said second end of said part by at least a predetermined distance;

means for measuring said primary voltage and said secondary voltage;

means for generating a first signal having a first value representing the ratio of the primary voltage to the secondary voltage multiplied by said turns ratio; and means for storing a calibration signal proportional to said first value, whereby said electrical load is represented.

12. Apparatus, as claimed in claim 11, wherein said means for spacing comprises:

means for burning a tack weld from said part; and means for moving said platen through a predetermined distance in order to ensure that said first and second ends of said part are separated.

13. Apparatus, as claimed in claim 11, wherein said means for measuring comprises means for accumulating a predetermined number of values of said tap means voltage and said secondary voltage and for averaging said predetermined number of values of said tap means voltage and said secondary voltage.

14. Apparatus, as claimed in claim 13, wherein said means for measuring further comprises means for delaying for at least substantially one cycle of said primary voltage before accumulating said predetermined number of values of said primary voltage and said secondary voltage.

15. Apparatus, as claimed in claim 13, wherein said means for generating comprises means for calculating the ratio of said average primary voltage to said average secondary voltage multiplied by said turns ratio.

16. In an electrical welder including a movable platen for carrying a part to be welded and for spacing a first end and a second end of said part, a transformer having a primary winding and having a secondary winding electrically coupled to said platen, and tap means for varying the effective turns ratio of said primary and secondary windings, an improved process for representing the electrical load presented to said secondary winding by said part comprising in combination the steps of:

spacing said first end and said second end of said part by at least a predetermined distance;

measuring said primary voltage;

measuring said secondary voltage;

generating a first signal having a first value representing the ratio of the primary voltage to the secondary voltage multiplied by said turns ratio; and storing a calibration signal proportional to said first value, whereby said electrical load is represented.

17. A process, as claimed in claim 16, wherein said step of spacing comprises the steps of:

burning a tack weld from said part; and moving said platen through a predetermined distance in order to ensure that said first and second ends of said part are separated.

18. A process, as claimed in claim 16, wherein said step of measuring comprises the steps of:

accumulating a predetermined number of values of said primary voltage and said secondary voltage; and averaging said predetermined number of values of said primary voltage and said secondary voltage.

19. A process, as claimed in claim 18, wherein said step of measuring further comprises the step of delaying for at least substantially one cycle of said primary voltage before accumulating said predetermined number of values of said primary voltage and said secondary voltage.

20. A process, as claimed in claim 18, wherein said step of generating comprises the step of calculating the ratio of said average primary voltage to said average secondary voltage multiplied by said turns ratio.

21. In an electrical welder including a movable platen for spacing a first end and a second end of a part to be welded, a transformer having a secondary winding coupled to said platen for generating a secondary voltage, and a primary winding of said transformer to which is applied a primary voltage, improved apparatus for separating said first and second ends of said part by a predetermined initial distance at the beginning of a welding cycle comprising in combination:

voltage detection means for detecting said primary voltage and said secondary voltage;

position detecting means for detecting the position of said platen; and control means for opening a gap between said first and second ends of said part, for closing said gap until said detected primary voltage and said detected secondary voltage indicate that said first and seconds ends of said part have substantially touched, and for measuring the position of said platen at which said first and second ends substantially touched, whereby said part is positioned to the welding process.

22. Apparatus, as claimed in claim 21, wherein said control means for opening comprises:

means for burning a tack weld from said part; and means for moving said platen through a predetermined distance in order to ensure that said first and second ends of said part are separated by at least a predetermined initial gap.

23. Apparatus, as claimed in claim 21, wherein said control means for opening comprises means for generating a first control signal proportional to said secondary voltage time said turns ratio and for generating a second control signal proportional to said primary voltage minus said first signal times a balance factor.

24. Apparatus, as claimed in claim 21, and further comprising means for storing a value representing a nominal initial distance between said first and second ends of said part and tap means for varying the effective turns ratio of said primary winding and said secondary winding, wherein said control means for closing said gap comprise means for detecting the reduction of said secondary voltage relative to said primary voltage.

25. In an electrical welder including a movable platen for spacing a first end and a second end of a part to be welded, a transformer having a secondary winding coupled to said platen for generating a secondary voltage, and a primary winding of said transformer to which is applied a primary voltage, an improved process for separating said first and second ends of said part by a predetermined initial distance at the beginning of a welding cycle comprising in combination the steps of:

detecting said primary voltage and said secondary voltage;

detecting the position of said platen;

opening a gap between said first and second ends of said part;

closing said gap until said detected primary voltage and said detected secondary voltage indicate that said first and seconds ends of said part have substantially touched; and measuring the position of said platen at which said first and second ends substantially touched, whereby said part is positioned to initiate the welding process.

26. A process, as claimed in claim 25, wherein said step of opening a gap comprises:

burning a tack weld from said part; and moving said platen through a predetermined distance in order to ensure that said first and second ends of said part are separated by at least a predetermined initial gap.

27. A process, as claimed in claim 25, wherein said step of closing said gap comprises the steps of:

generating a first control signal proportional to said secondary voltage time said turns ratio; and generating a second control signal proportional to said primary voltage minus said first signal times a balance factor.

28. A process, as claimed in claim 25, and further comprising the steps of storing a value representing a nominal initial distance between said first and second ends of said part and varying the effective turns ratio of said primary winding and said secondary winding, wherein said step of closing said gap comprises the step of detecting the reduction of said secondary voltage relative to said primary voltage.

* * * * *